United States Patent [19]

Kinoshita et al.

[11] Patent Number: 4,683,827
[45] Date of Patent: Aug. 4, 1987

[54] MOVEMENT CONTROL APPARATUS FOR SEWING MACHINE

[75] Inventors: Tomoaki Kinoshita, Kanagawa; Kunio Takano, Tokyo; Yoichi Okiyama, Kanagawa; Osamu Tachikawa, Tokyo, all of Japan

[73] Assignee: Tokyo Juki Industrial Co., Ltd., Chofu, Japan

[21] Appl. No.: 758,655

[22] Filed: Jul. 24, 1985

[30] Foreign Application Priority Data

Jul. 31, 1984 [JP] Japan .................................. 59-160777

[51] Int. Cl.$^4$ ............................................. D05B 21/00
[52] U.S. Cl. ................................. 112/121.12; 112/453
[58] Field of Search ................... 112/121.12, 277, 275, 112/453, 456, 220, 262.1, 266.1

[56] References Cited

U.S. PATENT DOCUMENTS 4,318,357  3/1982  Minalga et al. .................. 112/456 X
4,404,509  9/1983  Hartwig ........................... 112/453 X
4,459,926  7/1984  Ohniwa ........................... 112/121.12

Primary Examiner—Peter Nerbun
Attorney, Agent, or Firm—Tarolli, Sundheim & Covell

[57] ABSTRACT

A movement control apparatus for a sewing machine to automatically control movement initiating timing corresponding to various sewing machine speeds.

4 Claims, 7 Drawing Figures

Fig. 7

| SEWING MACHINE SPEED (β) | MOVEMENT CONTROL VALUE |
|---|---|
| 0 ~ 100 | 0 |
| 100 ~ 200 | 1 |
| 200 ~ 300 | 2 |
| ⋮ | ⋮ |
| 800 ~ 900 | 8 |
| ⋮ | ⋮ |
| 1600 ~ 1700 | 16 |
| ⋮ | ⋮ |

FAST ↑ ↓ SLOW

MOVEMENT CONTROL APPARATUS FOR SEWING MACHINE

BACKGROUND OF THE INVENTION

The present invention relates to a sewing machine which performs program control of sewing patterns, and more particularly to a movement control apparatus of a work holder of such sewing machines.

In some known sewing machines, sewing patterns are stored as coordinate values in memory medium, e.g., magnetic tape or magnetic card, and a work holder is moved in accordance with the sewing patterns information. In such sewing machines, a workpiece is moved to the next sewing point determined by the sewing patterns information while the needle is disengaged from the workpiece.

FIG. 1 illustrates a conventional movement control. So-called needle bar loci 1 and 2 are shown, in which needle bar locus 2 is twice the speed of the needle bar locus 1. Points $A_1$ and $A_2$ represent needle disengagement points and points $B_1$ and $B_2$ represent needle insertion points. Points $C_1$ and $C_2$ represent upper dead points which are highest points of the needle. In this stage, the movement period to move the work holder is determined between the needle disengagement point $A_1$ or $A_2$ and the needle insertion point $B_1$ or $B_2$. In the needle bar locus 1 (hereinafter referred to as "locus 1"), the period 3 is the movement period. In the needle bar locus 2 (hereinafter to as "locus 2"), the period 5 is the movement period. To move the workpiece within the movement period, necessary pulse number based on the coordinate values information of the sewing patterns is moved to X coordinate pulse motor and Y coordinate pulse motor and the work holder is moved to predetermined distance.

The pulse motors have an inherent delay time $\alpha$, so that when motor drive pulse is applied, the motor starts after the delay time $\alpha$. Thus, in conventional movement control, movement pulse input timing is controlled previously by considering the delay time $\alpha$ of the pulse motor.

More particularly, in the known movement control, when the workpiece is to be sewn according to the sewing machine speed shown in the locus 1, a movement timing is set at a point 7 (hereinafter referred to as "movement point 7") having an upper shaft angle before the delay time $\alpha$ rather than the movement period 3 in order to move the workpiece within the movement period 3. Thus, when the upper shaft angle is reached at the movement point 7, a pulse generator applies a predetermined number of drive pulse train 8 synchronous with the sewing machine speed to the pulse motor. The pulse motor drives the work holder after the delay time $\alpha$ from receiving the drive pulse. Thus, drive period 9 of the work holder is within the movement period 3 as shown in FIG. 1, and the workpiece is moved accurately within the movement period 3.

In such known movement control, when the sewing machine speed is increased as shown in locus 2, a predetermined number of drive pulse train 8' is applied to the pulse motor synchronous with the sewing machine speed. The pulse initiates at the same movement point 7' of the upper shaft angle. As the upper shaft rotates twice in this case, time lapse from the point 7' to the needle disengagement point $A_2$ is not the delay time $\alpha$. That means, the work holder is not started to move at the needle disengagement point $A_2$, and the pulse motor drive period 9' does not coincide with the movement period 5. Consequently, as shown in FIG. 1, needle insert time $B_2$ may be within the drive period 9', so that stitch errror or needle breakage may result.

SUMMARY OF THE INVENTION

Accordingly, the primary object of the present invention is to eliminate the above-mentioned disadvantages of pitch error of stitch and needle breakage or bending, and to provide a movement control apparatus of a sewing machine to automatically control movement initiating timing corresponding to various sewing machine speeds.

According to the present invention, a movement control apparatus of a sewing machine which performs program control of sewing patterns, comprises a memory means storing movement control values to control input timing of driving pulse to the pulse motors corresponding to sewing machine speeds, a pulse generating means generating at least two speed pulses synchronous with the sewing machine speed and then generating drive pulse train to said pulse motors, a detecting means detecting sewing speed from said sewing machine speed pulses, and a control means reading said movement control value corresponding to output of the detecting means and utilizing a portion of said drive pulse corresponding to said movement control value as input timing regulating pulse.

According to the present invention, the memory circuit previously stores most suitable movement control values corresponding to various sewing speeds, and control means reads the movement control value corresponding to detected sewing machine speed. Base on the movement control value, pulse motor drive pulse input timing discriminated to move a work holder.

Consequently, a work holder is moved automatically and accurately corresponding to detected sewing machine speed, so that no stitch error occurs, no work holder movement occurs while needle insertion period so that needle breakage or bending do not occur.

BRIEF DESCRIPTION OF THE DRAWINGS

FIG. 7 is a conversion table between sewing machine speed and movement control value in the memory circuit shown in FIG. 2.

DETAILED DESCRIPTION OF THE PREFERRED EMBODIMENTS

Figure 2:
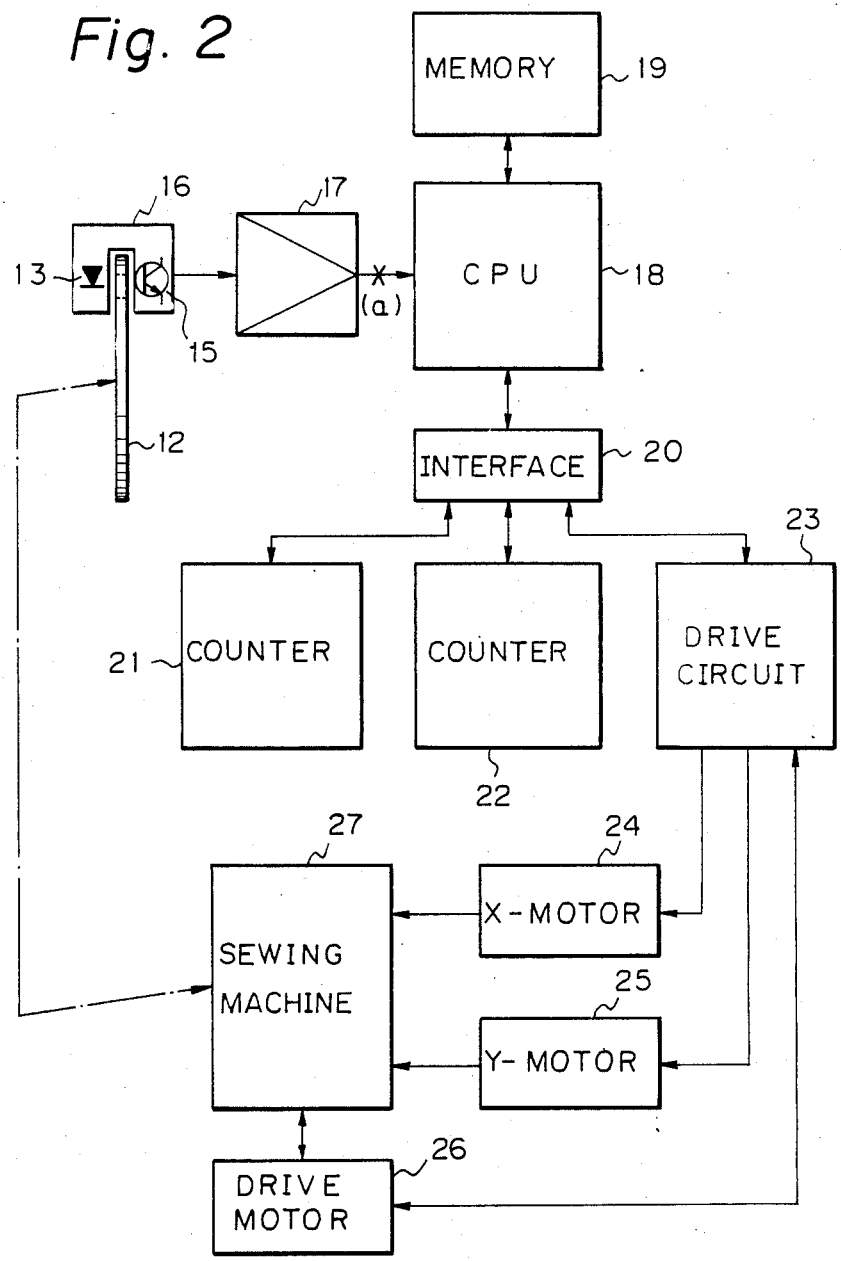
FIG. 2 is a simplified block diagram of a movement control apparatus according to the present invention.

FIG. 2 shows a block diagram of the control device and associated components of the sewing machine, according to the present invention. A photo interrupter 16 is formed by a photo diode 13 and a photo transistor 15 which are opposed each other and between which a slit plate 12 which is attached to a pulley (not shown) rotates. Output of the photo interrupter 16 is connected to an amplifier circuit 17 which in turn is connected with a central process unit (CPU) 18. A memory circuit 19 which stores movement control information is connected with CPU 18. Counters 21 and 22 and a drive circuit 23 are connected through an interface circuit 20 with the CPU 18. Output of the drive circuit 23 is connected with an x-coordinate pulse motor 24, a y-coordinate pulse motor 25 and a sewing machine drive motor 26 respectively. The outputs of the motors 24, 25 and 26 are applied to a sewing machine 27.

Figure 3:
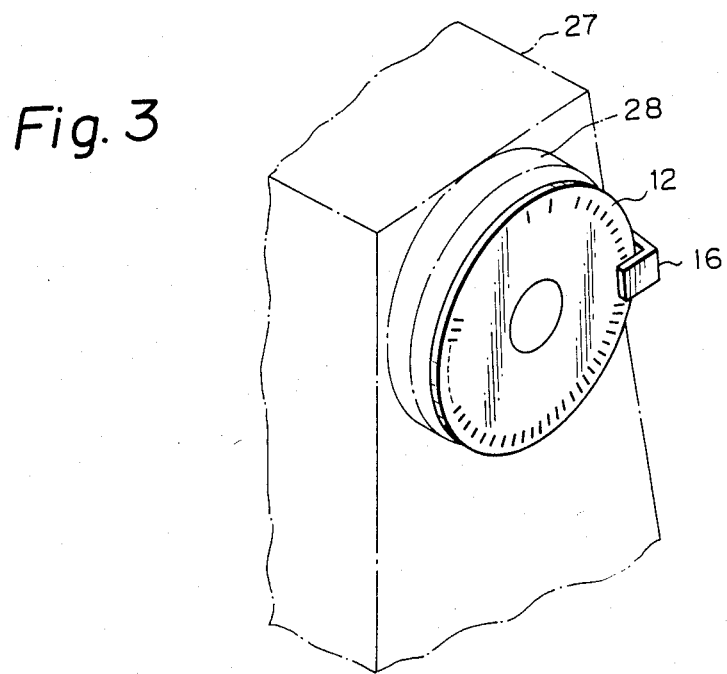
FIG. 3 is a perspective view showing a mounting of the slit plate shown in FIG. 2.

FIG. 3 shows the mounting of the slit plate 12. As shown, the slit plate 12 is mounted on a main pulley 28 of the sewing machine 27.

Figure 4:
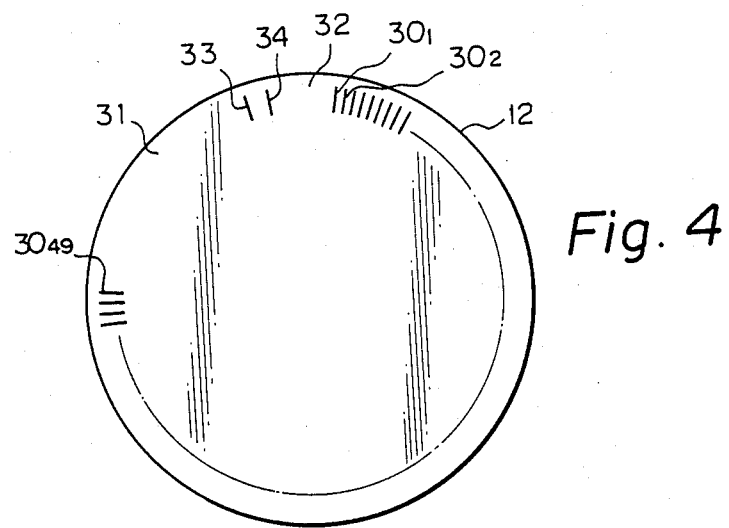
FIG. 4 is a simplified plan view of the slit plate shown in FIG. 3.

FIG. 4 shows arrangement of slits in the slit plate 12. 49 slits $30_1$–$30_{49}$ for drive pulse are formed at a uniform distance in the slit plate 12. Sewing machine speed detecting slits 33 and 34 are formed at a predetermined distances 31 and 32 respectively from the last slit $30_{49}$ and the first slit $30_1$.

Figure 1:
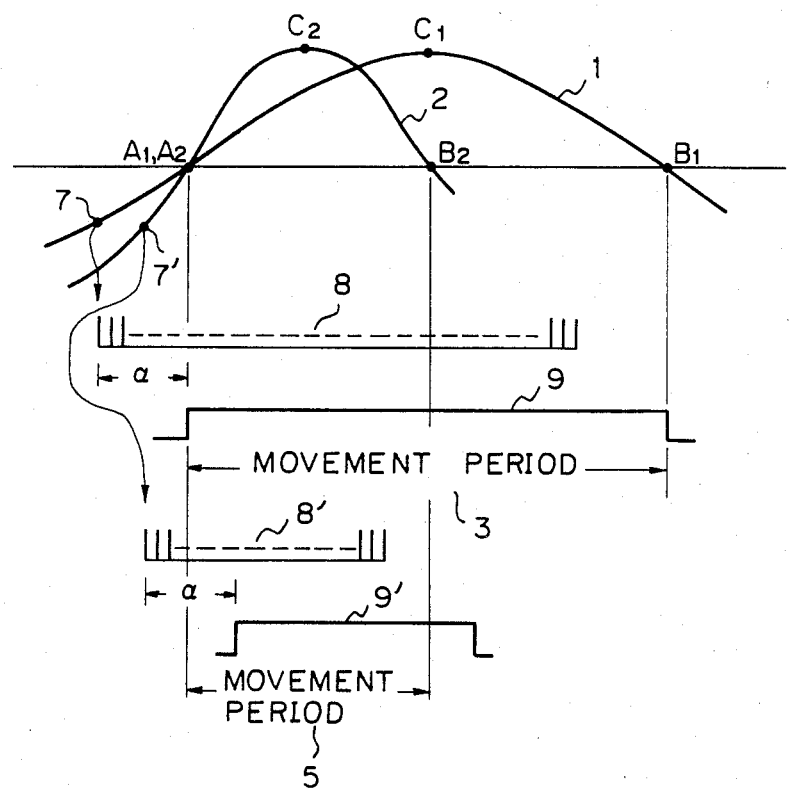
FIG. 1 is an illustration of a conventional movement control of sewing machine.

Operation of the present invention will be described referring to FIG. 5 which shows a movement control according to the present invention. Same reference numeral shows same or similar part or portion described in FIG. 1. Position of the slit plate 12 is previously set relating movement information set position in the memory circuit 19.

Figure 6:
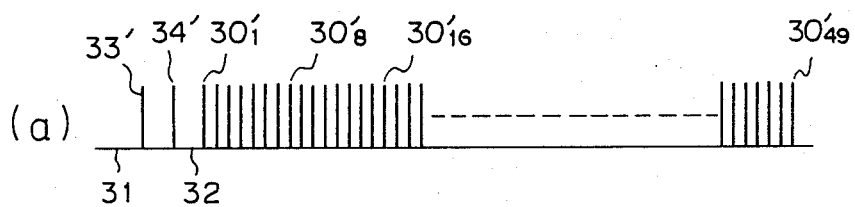
FIG. 6 is output of point (a) shown in FIG. 2.

A sewing pattern is selected as desired, and the sewing process is started. As the drive motor 26 drives the operating mechanism of the sewing machine 27, it drives the pulley 28 and also the slit plate 12. By rotation of the slit plate 12, the photo interruptor 16 detects the slits and it applies a pulse signal for each slit (hereinafter referred to as "slit pulse"). The pulse signal is amplified in the amplifier circuit 17 as shown in FIG. 6 and is supplied to the CPU 18. The CPU 18 discriminates a pulse after a predetermined space 31 as the speed detecting slit pulse 33'. When the pulse 33' is applied, the CPU 18 resets the counter 21. When the counter 21 is reset, a constant high speed clock pulse in the CPU 18 is counted from zero. When the next speed detecting slit pulse 34' is applied to the CPU 18, count $\beta$ of the counter 21 is read by the CPU 18. Thus, sewing machine speed is detected. When the sewing machine speed is high, the distance between the speed detecting slit pulses 33' and 34' is detected as narrow, and when the sewing machine speed is low, the distance between the slit pulses 33' and 34' is detected as wide. The count $\beta$ of the counter 21 is proportional to the sewing machine speed. The CPU 18 discriminates the sewing machine speed by the count $\beta$ of the counter 21 and read out a movement control value corresponding to the sewing machine speed from the memory circuit 19.

The slit plate 12 is mounted on the pulley 28 such that a reference slit, e.g., the speed detecting slit 33 is detected by the photo interruptor 16 when the pulley 28 is reference upper shaft angle, e.g. ⅛ cycle before needle disengagement point. As shown in FIG. 7, in the memory circuit 19, various movement control values corresponding to various sewing machine speeds are stored such that when the sewing machine speed is reference value, e.g. $\beta = 100 \sim 200$, most suitable movement control value 1, e.g. first pulse from the slits $30_1$–$30_{49}$ is supplied. The movement control values are sorted in the memory circuit as number of the slit pulses.

Figure 5:
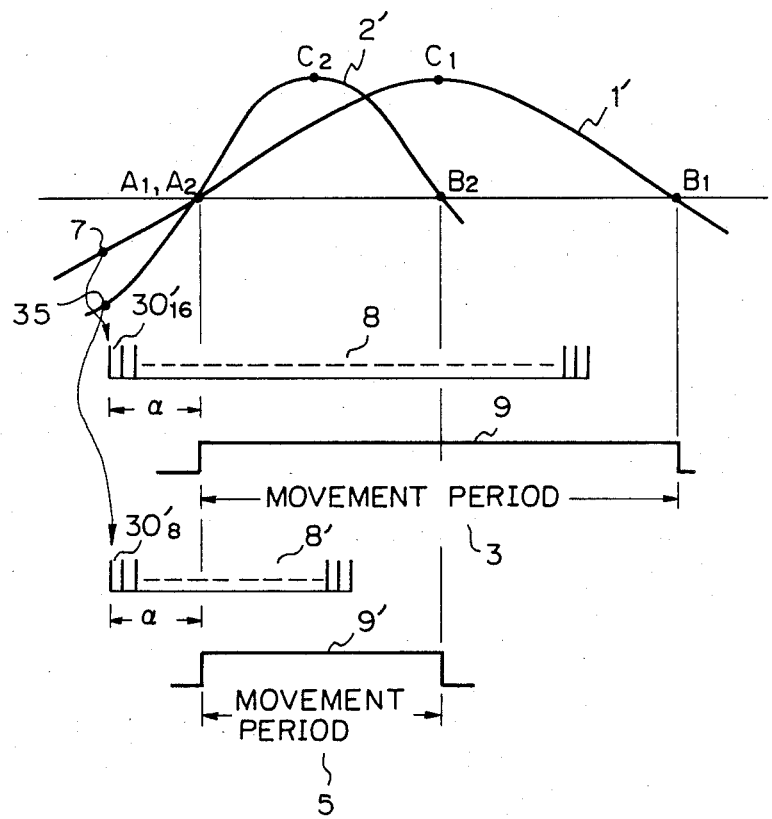
FIG. 5 is an illustration of a movement control according to the present invention.

Assume that, the sewing machine is operating describing needle bar locus 1' shown in FIG. 5 and the CPU 18 reads the count $\beta = 1600$ from the counter 21. The CPU reads out a movement control value of 16 from the memory circuit corresponding to the count $\beta = 1600$ as shown in FIG. 7.

The CPU 18 actuates the counter 22 such that slit pulses $30'_1$–$30'_{49}$ after the predetermined space 32 are sequentially counted by the counter 22. The count is compared with the movement control value 16. When the slit pulse $30'_{16}$ is applied to the CPU 18, and the count of the counter 22 is 16, the CPU 18 applies the slit pulses $30'_{16}$ and after in the number based on the coordinate information of the sewing pattern to the drive circuit 23 as the drive pulses 8. Thus, the pulse motors 24 and 25 are driven to move the work holder for a predetermined distance.

As described, 16 pulses corresponding to the slit pulses $30'_1$–$30'_{16}$ are utilized as delay pulses to select the movement point 7 (FIG. 5) and the slit pulse $30'_{16}$ is applied to the pulse motors as the first drive pulse. The pulse motors actuate after a delay time $\alpha$, however, the movement point 7 is automatically selected to a point of upper shaft angle corresponding to before the delay time $\alpha$, so that driven period 9 is within movement period 3. Thus, a workpiece is accurately moved within the movement period 3.

When the sewing machine speed is doubled compared to the needle bar locus 1, and follows locus 2 in FIG. 5, the counter counts $\beta = 800$ between the speed detecting slit pulses 33' and 34'. The CPU 18 reads the count value of and obtains movement control value of 8 from the memory circuit 19 as shown in FIG. 7. In this case, slit pulses $30'_1$–$30'_8$ are used as delay pulses to select the movement point, and the slit pulse $30'_8$ is applied to the pulse motors as the first drive pulse. The slit pulse $30'_8$ is half delay time compared with the above-described slit pulse $30'_{16}$. Consequently, when the sewing machine speed is doubled, the movement point 35 on the locus 2' is automatically selected at a point twice earlier upper shaft angle compared with the movement point 7 on the locus 1'. The pulse motors actuate after the delay time $\alpha$. However, the movement point 35 is selected automatically as a point of the upper shaft angle before the delay time $\alpha$. Thus, the drive period 9' of the work holder is within the movement period 5 shown in FIG. 5 and the workpiece is moved accurately within the movement period 5.

Although the invention has been described in its preferred form with a certain degree of particularity, it is understood that the present disclosure of the preferred form can be changed in the details of construction and the combination, and arrangement of parts may be restored to without departing from the spirit and the scope of the invention as hereinafter claimed.

What is claimed is:

1. A movement control apparatus for a sewing machine which previously stores sewing pattern data and drives a work holder by pulse motors to move a workpiece in accordance with the sewing pattern data in synchronization with the sewing machine speed, said apparatus comprising:
   (a) pulse generating means for generating at least two sewing machine speed pulses synchronized with the sewing machine speed and for generating drive pulses;
   (b) memory means for storing movement control values corresponding to various sewing machine speeds as a plurality of numbers of drive pulses from said pulse generating means;
   (c) movement control means for controlling input timing of the drive pulses to the pulse motor to correspond to sewing machine speeds with an intrinsic delay time, said intrinsic delay time being the time from inputting the drive pulses to the pulse motors until the pulse motors are driven;

(d) detecting means for detecting sewing machine speed from the sewing machine speed pulses; and (e) control means for reading the value corresponding to output of said detecting means and utilizing a portion of the drive pulses corresponding to one of the movement control values as input timing regulating pulses.

2. A movement control apparatus as set forth in claim 1 wherein said detecting means comprises a first counter counting constant period clock pulses between the two sewing machine speed pulses.

3. A movement control apparatus as set forth in claim 1 or 2 wherein said control means comprises a second counter sequentially counting the drive pulses and a control circuit comparing the movement control value with a count value of said second counter and applying drive pulses sequentially to the pulse motors when said second counter value reaches the movement control value.

4. A movement control apparatus as set forth in claim 3 wherein said pulse generating means comprises:

a slit plate having a first slit for generating the sewing machine speed pulses, a second slit spaced a predetermined distance from said slit and for generating the sewing machine speed pulses and a plurality of slits spaced a predetermined distance from the second slit and uniformly spaced from each other; and a photo interruptor having a light emit element and a light receive element disposed on opposite sides of said slit plate;

said slit plate being mounted to a pulley having a predetermined positional relation.

* * * * *